United States Patent
Vallius

(10) Patent No.: US 10,234,686 B2
(45) Date of Patent: Mar. 19, 2019

(54) RAINBOW REMOVAL IN NEAR-EYE DISPLAY USING POLARIZATION-SENSITIVE GRATING

(71) Applicant: Microsoft Technology Licensing, LLC, Redmond, WA (US)

(72) Inventor: Tuomas Vallius, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 196 days.

(21) Appl. No.: 14/942,408

(22) Filed: Nov. 16, 2015

(65) Prior Publication Data

US 2017/0139210 A1    May 18, 2017

(51) Int. Cl.
*G02B 27/01* (2006.01)
*G02B 5/18* (2006.01)
(Continued)

(52) U.S. Cl.
CPC ....... *G02B 27/0172* (2013.01); *G02B 5/1842* (2013.01); *G02B 6/005* (2013.01);
(Continued)

(58) Field of Classification Search
None
See application file for complete search history.

(56) References Cited

U.S. PATENT DOCUMENTS 3,980,883 A    9/1976  Franks
4,711,512 A   12/1987  Upatnieks
(Continued)

FOREIGN PATENT DOCUMENTS

CN    100433043 C    11/2008
CN    102902060 A    1/2013
(Continued)

OTHER PUBLICATIONS

"International Search Report and Written Opinion Issued in PCT Application No. PCT/US2016/061014", dated Feb. 10, 2017, 11 Pages.
(Continued)

*Primary Examiner* — Derek S Chapel
(74) *Attorney, Agent, or Firm* — Mark K. Young; Mayer & Williams PC

(57) ABSTRACT

In a near-eye optical display system comprising a waveguide and diffractive optical elements (DOEs) configured for in-coupling, exit pupil expansion, and out-coupling, a rainbow phenomenon manifested in the display may be removed or reduced using a polarizing filter at the front of the system so that real-world/stray light entering the system has a particular polarization state, for example TM-polarized. The polarizing filter is utilized in conjunction with a downstream out-coupling DOE that includes diffractive grating structures that are configured to enable sensitivity to an opposite polarization state, for example TE-polarized. An imager is configured to produce virtual-world images that also have a TE-polarized state. The polarization-sensitive out-coupling DOE diffracts the TE-polarized imaging beam out of the grating for display while the TM-polarized light from the real world and/or stray light passes through the grating without diffraction and thus cannot contribute to rainbows in the display.

4 Claims, 11 Drawing Sheets

(51) Int. Cl.
  *F21V 8/00* (2006.01)
  *G02B 27/00* (2006.01)
  *G02B 27/28* (2006.01)
  *G02B 27/42* (2006.01)
  *G02B 27/18* (2006.01)

(52) U.S. Cl.
  CPC ....... *G02B 6/0026* (2013.01); *G02B 27/0081* (2013.01); *G02B 27/286* (2013.01); *G02B 27/4211* (2013.01); *G02B 27/4261* (2013.01); *G02B 27/18* (2013.01); *G02B 2027/012* (2013.01); *G02B 2027/0116* (2013.01); *G02B 2027/0118* (2013.01); *G02B 2027/0125* (2013.01)

(56) References Cited

U.S. PATENT DOCUMENTS

| | | | |
|---|---|---|---|
| 4,743,083 A | 5/1988 | Schimpe | |
| 5,061,025 A | 10/1991 | Debesis | |
| 5,218,471 A | 6/1993 | Swanson et al. | |
| 5,224,198 A | 6/1993 | Jachimowicz et al. | |
| 5,340,637 A | 8/1994 | Okai et al. | |
| 5,532,736 A | 7/1996 | Kuriki et al. | |
| 5,751,388 A | 5/1998 | Larson | |
| 5,907,427 A | 5/1999 | Scalora et al. | |
| 6,046,541 A | 4/2000 | Valliath et al. | |
| 6,140,980 A | 10/2000 | Spitzer et al. | |
| 6,147,725 A | 11/2000 | Yuuki et al. | |
| 6,232,044 B1 | 5/2001 | Gibbons et al. | |
| 6,259,561 B1 | 7/2001 | George et al. | |
| 6,410,213 B1 | 6/2002 | Raguin et al. | |
| 6,580,529 B1 | 6/2003 | Amitai et al. | |
| 6,587,619 B1 | 7/2003 | Kinoshita | |
| 6,700,552 B2 | 3/2004 | Kollin et al. | |
| 6,833,956 B2 | 12/2004 | Lee | |
| 6,836,365 B2 | 12/2004 | Goto | |
| 6,873,463 B2 | 3/2005 | Nakai | |
| 6,909,546 B2 | 6/2005 | Hirai | |
| 6,950,227 B2 | 9/2005 | Schrader | |
| 6,990,275 B2 | 1/2006 | Kersten et al. | |
| 7,123,415 B2 | 10/2006 | Mercer | |
| 7,129,028 B2 | 10/2006 | Koeda et al. | |
| 7,224,854 B2 | 5/2007 | Ellwood, Jr. | |
| 7,236,251 B2 | 6/2007 | Takaoka | |
| 7,339,738 B1 | 3/2008 | Carr et al. | |
| 7,391,524 B1 | 6/2008 | Chen et al. | |
| 7,483,604 B2 | 1/2009 | Levola | |
| 7,492,512 B2 | 2/2009 | Niv et al. | |
| 7,492,517 B2 | 2/2009 | McGrew | |
| 7,525,672 B1 | 4/2009 | Chen et al. | |
| 7,565,041 B2 | 7/2009 | Little et al. | |
| 7,573,640 B2 | 8/2009 | Nivon et al. | |
| 7,576,866 B2 | 8/2009 | Ohkubo | |
| 7,627,018 B1 | 12/2009 | Guilfoyle et al. | |
| 7,710,628 B2 | 5/2010 | Morizono et al. | |
| 7,719,675 B2 | 5/2010 | Grygier et al. | |
| 7,738,746 B2 | 6/2010 | Charters et al. | |
| 7,959,308 B2 | 6/2011 | Freeman et al. | |
| 7,981,591 B2 | 7/2011 | Li et al. | |
| 8,135,227 B2 | 3/2012 | Lewis et al. | |
| 8,152,307 B2 | 4/2012 | Duelli et al. | |
| 8,160,411 B2 | 4/2012 | Levola et al. | |
| 8,208,191 B2 | 6/2012 | Gan et al. | |
| 8,233,204 B1 | 7/2012 | Robbins et al. | |
| 8,314,993 B2 | 11/2012 | Levola | |
| 8,320,032 B2 | 11/2012 | Levola | |
| 8,376,548 B2 | 2/2013 | Schultz | |
| 8,463,080 B1 | 6/2013 | Anderson et al. | |
| 8,466,953 B2 | 6/2013 | Levola | |
| 8,482,859 B2 | 7/2013 | Border et al. | |
| 8,488,246 B2 | 7/2013 | Border et al. | |
| 8,508,848 B2 | 8/2013 | Saarikko | |
| 8,547,638 B2 | 10/2013 | Levola | |
| 8,548,290 B2 | 10/2013 | Travers et al. | |
| 8,579,492 B2 | 11/2013 | Epstein et al. | |
| 8,593,734 B2 | 11/2013 | Laakkonen | |
| 8,675,182 B2 | 3/2014 | Bamji | |
| 8,681,184 B2 | 3/2014 | Seesselberg et al. | |
| 8,699,137 B2 | 4/2014 | McGrew | |
| 8,736,963 B2 | 5/2014 | Robbins et al. | |
| 8,749,796 B2 | 6/2014 | Pesach et al. | |
| 8,792,169 B2 | 7/2014 | Jiang et al. | |
| 8,830,584 B2 | 9/2014 | Saarikko et al. | |
| 8,903,207 B1 * | 12/2014 | Brown .............. | G02B 27/0103 359/1 |
| 9,239,471 B2 | 1/2016 | Zalevsky et al. | |
| 9,341,846 B2 | 5/2016 | Popovich et al. | |
| 9,671,615 B1 | 6/2017 | Vallius et al. | |
| 9,864,208 B2 | 1/2018 | Vallius et al. | |
| 9,910,276 B2 | 3/2018 | Vallius et al. | |
| 10,038,840 B2 | 7/2018 | Vallius | |
| 10,073,278 B2 | 9/2018 | Vallius | |
| 2001/0015851 A1 | 8/2001 | Danziger et al. | |
| 2001/0033716 A1 | 10/2001 | Fukutomi | |
| 2001/0036012 A1 | 11/2001 | Nakai et al. | |
| 2002/0080491 A1 | 6/2002 | Goto | |
| 2003/0107787 A1 | 6/2003 | Bablumyan | |
| 2004/0062502 A1 | 4/2004 | Levola | |
| 2004/0071180 A1 | 4/2004 | Wang | |
| 2004/0170356 A1 | 9/2004 | Iazikov et al. | |
| 2004/0184147 A1 | 9/2004 | Parikka et al. | |
| 2004/0218172 A1 | 11/2004 | Deverse et al. | |
| 2004/0233534 A1 | 11/2004 | Nakanishi et al. | |
| 2005/0002611 A1 | 1/2005 | Levola | |
| 2005/0180674 A1 | 8/2005 | Ellwood, Jr. | |
| 2005/0189315 A1 | 9/2005 | Knight et al. | |
| 2006/0056028 A1 | 3/2006 | Wildnauer | |
| 2006/0132914 A1 | 6/2006 | Weiss et al. | |
| 2006/0221448 A1 | 10/2006 | Nivon et al. | |
| 2007/0008624 A1 | 1/2007 | Hirayama | |
| 2007/0188837 A1 | 8/2007 | Shimizu et al. | |
| 2007/0201795 A1 | 8/2007 | Rice et al. | |
| 2007/0242253 A1 | 10/2007 | Visser et al. | |
| 2007/0291362 A1 | 12/2007 | Hill et al. | |
| 2008/0043334 A1 | 2/2008 | Itzkovitch et al. | |
| 2008/0138013 A1 | 6/2008 | Parriaux | |
| 2008/0212921 A1 | 9/2008 | Gaylord et al. | |
| 2008/0297731 A1 | 12/2008 | Powell et al. | |
| 2009/0009486 A1 | 1/2009 | Sato et al. | |
| 2009/0040607 A1 | 2/2009 | Amako et al. | |
| 2009/0128911 A1 | 5/2009 | Itzkovitch et al. | |
| 2009/0180166 A1 | 7/2009 | Hefetz et al. | |
| 2009/0245730 A1 | 10/2009 | Kleemann | |
| 2009/0257106 A1 | 10/2009 | Tan et al. | |
| 2009/0303599 A1 | 12/2009 | Levola | |
| 2010/0079865 A1 | 4/2010 | Saarikko et al. | |
| 2010/0134534 A1 | 6/2010 | Seesselberg et al. | |
| 2010/0149073 A1 | 6/2010 | Chaum et al. | |
| 2010/0177388 A1 | 7/2010 | Cohen et al. | |
| 2010/0201953 A1 | 8/2010 | Freeman et al. | |
| 2010/0231693 A1 | 9/2010 | Levola | |
| 2010/0232016 A1 | 9/2010 | Landa et al. | |
| 2010/0277803 A1 | 11/2010 | Pockett et al. | |
| 2010/0284085 A1 | 11/2010 | Laakkonen | |
| 2010/0296163 A1 | 11/2010 | Saarikko | |
| 2010/0315719 A1 | 12/2010 | Saarikko et al. | |
| 2010/0321781 A1 | 12/2010 | Levola | |
| 2011/0002143 A1 | 1/2011 | Saarikko et al. | |
| 2011/0019874 A1 | 1/2011 | Jarvenpaa | |
| 2011/0038049 A1 | 2/2011 | Vallius | |
| 2011/0096401 A1 | 4/2011 | Levola | |
| 2011/0115733 A1 | 5/2011 | Shih | |
| 2011/0261366 A1 | 10/2011 | Tearney et al. | |
| 2012/0019647 A1 | 1/2012 | Kempe et al. | |
| 2012/0075168 A1 | 3/2012 | Osterhout et al. | |
| 2012/0120365 A1 | 5/2012 | Legerton et al. | |
| 2012/0224062 A1 | 9/2012 | Lacoste et al. | |
| 2013/0051730 A1 | 2/2013 | Travers et al. | |
| 2013/0077049 A1 | 3/2013 | Bohn | |
| 2013/0100362 A1 | 4/2013 | Saeedi et al. | |
| 2013/0135193 A1 | 5/2013 | Fike et al. | |
| 2013/0222384 A1 | 8/2013 | Futterer | |
| 2013/0242392 A1 | 9/2013 | Amirparviz et al. | |

(56) References Cited

U.S. PATENT DOCUMENTS

| | | |
|---|---|---|
| 2013/0250430 A1 | 9/2013 | Robbins et al. |
| 2013/0261782 A1 | 10/2013 | Becken et al. |
| 2013/0314793 A1 | 11/2013 | Robbins et al. |
| 2013/0322810 A1 | 12/2013 | Robbins |
| 2014/0002608 A1 | 1/2014 | Atwell et al. |
| 2014/0043689 A1 | 2/2014 | Mason |
| 2014/0064655 A1 | 3/2014 | Nguyen et al. |
| 2014/0104665 A1 | 4/2014 | Popovich et al. |
| 2014/0140654 A1 | 5/2014 | Brown et al. |
| 2014/0168167 A1 | 6/2014 | Chou |
| 2014/0168260 A1 | 6/2014 | O'brien et al. |
| 2014/0185142 A1 | 7/2014 | Gupta et al. |
| 2014/0217385 A1 | 8/2014 | Gaertner et al. |
| 2014/0240613 A1 | 8/2014 | Bohn et al. |
| 2014/0240834 A1 | 8/2014 | Mason |
| 2014/0240843 A1 | 8/2014 | Kollin |
| 2014/0293434 A1 | 10/2014 | Cheng et al. |
| 2014/0300695 A1 | 10/2014 | Smalley et al. |
| 2015/0034591 A1 | 2/2015 | Vink et al. |
| 2015/0083917 A1 | 3/2015 | Wyrwas et al. |
| 2015/0092042 A1 | 4/2015 | Fursich |
| 2015/0108479 A1 | 4/2015 | Brinkley et al. |
| 2015/0185475 A1 | 7/2015 | Saarikko et al. |
| 2015/0234477 A1 | 8/2015 | Abovitz et al. |
| 2015/0234491 A1 | 8/2015 | Liu et al. |
| 2015/0277116 A1 | 10/2015 | Richards et al. |
| 2015/0331544 A1 | 11/2015 | Bergstrom et al. |
| 2015/0355394 A1 | 12/2015 | Valera et al. |
| 2015/0382465 A1 | 12/2015 | Steyn et al. |
| 2016/0018637 A1 | 1/2016 | Sparks et al. |
| 2016/0026253 A1 | 1/2016 | Bradski et al. |
| 2016/0116739 A1 | 4/2016 | Tekolste et al. |
| 2016/0231478 A1 | 8/2016 | Kostamo |
| 2016/0231566 A1 | 8/2016 | Levola et al. |
| 2016/0231570 A1 | 8/2016 | Levola et al. |
| 2016/0234485 A1 | 8/2016 | Robbins et al. |
| 2016/0291405 A1 | 10/2016 | Frisken et al. |
| 2016/0327789 A1 | 11/2016 | Klug et al. |
| 2016/0334635 A1 | 11/2016 | Ushigome |
| 2017/0003504 A1 | 1/2017 | Vallius et al. |
| 2017/0003505 A1 | 1/2017 | Vallius et al. |
| 2017/0031171 A1 | 2/2017 | Vallius et al. |
| 2017/0034435 A1 | 2/2017 | Vallius |
| 2017/0059879 A1 | 3/2017 | Vallius |
| 2017/0102543 A1 | 4/2017 | Vallius |
| 2017/0102544 A1 | 4/2017 | Vallius |
| 2017/0122725 A1 | 5/2017 | Yeoh et al. |
| 2017/0123208 A1 | 5/2017 | Vallius |
| 2017/0124928 A1 | 5/2017 | Edwin et al. |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0153460 A1 | 6/2017 | Vallius et al. |
| 2017/0184848 A1* | 6/2017 | Vallius ............... G02B 3/14 |

FOREIGN PATENT DOCUMENTS

| | | |
|---|---|---|
| CN | 103677448 A | 3/2014 |
| CN | 103995354 A | 8/2014 |
| EP | 2163924 A1 | 3/2010 |
| EP | 2752691 A1 | 7/2014 |
| EP | 2887119 A1 | 6/2015 |
| GB | 2495398 A | 4/2013 |
| JP | S06218502 A | 1/1987 |
| WO | 1995004294 A2 | 2/1995 |
| WO | 2004055556 A1 | 7/2004 |
| WO | 2004109349 A2 | 12/2004 |
| WO | 2006064334 A1 | 6/2006 |
| WO | 2006132614 A1 | 12/2006 |
| WO | 2007141589 A1 | 12/2007 |
| WO | 2008038058 A1 | 4/2008 |
| WO | 2008081070 A1 | 7/2008 |
| WO | 2008148927 A1 | 12/2008 |
| WO | 2009101236 A1 | 8/2009 |
| WO | 2009101238 A1 | 8/2009 |
| WO | 2009077803 A1 | 11/2010 |
| WO | 2010062481 A1 | 1/2011 |
| WO | 2012169889 A1 | 12/2012 |
| WO | 2013167864 A1 | 11/2013 |
| WO | 2015063808 A1 | 5/2015 |

OTHER PUBLICATIONS

"Waveguide-based Displays Maturing for Augmented Reality Applications", Retrieved on: Jul. 14, 2015, Available at: http://www.displaydaily.com/articles/446-sponsored-articles/14132-waveguide-based-displays-maturing-for-augmented-reality-applications (5 pages total).

Yang, et al., "High-performance and Compact Binary Blazed Grating Coupler Based on an Asymmetric Subgrating Structure and Vertical Coupling", In Optics Letters, vol. 36, No. 14, Jul. 15, 2011, (5 pages total).

Todd, Michael D., "Fiber Optic Bragg Grating-Based Sensing", Published on: Jun. 15, 2012, Available at: http://www.sem.org/pdf/fiber_bragg_grating_sensing.pdf (36 pages).

Zhang, et al., "Advances in Optical Fiber Bragg Grating Sensor Technologies", In Photonic Sensors, vol. 2, No. 1, Mar. 2012, (13 pages total).

Uranga, et al., "Focused Ion Beam Nano-structuring of Photonic Bragg Gratings in Al2o3 Waveguides", In Proceedings of 12th Annual Symposium IEEE/LEOS Benelux, Dec. 17, 2007, (4 pages total).

Cheng, et al., "Design of an Ultra-Thin Near-Eye Display with Geometrical Waveguide and Freeform Optics", In Proceedings of Optics Express, vol. 22, Issue 17, Aug. 2014, (15 pages total).

Sentenac, et al., "Angular Tolerant Resonant Grating Filters under Oblique Incidence", Journal of Optics Soc. Am. A, vol. 22, No. 4, Mar. 2005, pp. 475-480 (6 pages total).

"International Search Report and Written Opinion Issued in PCT Application No. PCT/US2016/052405", dated Dec. 21, 2016, (10 Pages total).

"Second Written Opinion Issued in PCT Application No. PCT/US2016/061014", dated Nov. 3, 2017, 5 Pages.

Platte, et al., "Optically Induced Mask-Controlled Time-Variable Periodic Microwave Structures", In Proceedings of the IEEE Transactions on Microwave Theory and Techniques, vol. 48, Issue 5, May 2000, 6 Pages.

Powell, et al., "Novel Approach to Exit Pupil Expansion for Wearable Displays", In Proceedings of the SPIE 4711, Helmet- and Head-Mounted Displays VII, Aug. 5, 2002, 3 Pages.

Saarikko, Pasi, "Diffractive exit-pupil expander for spherical light guide virtual displays designed for near-distance viewing", In Journal of Optics A, Pure and Applied Optics, vol. 11, Issue 6, Mar. 31, 2009, 10 Pages.

Saarikko, Pasi, "Diffractive Exit-Pupil Expander with a Large Field of View", In Proceedings of the Photonics in Multimedia II, 700105 SPIE 7001, Apr. 25, 2008, 3 Pages.

"Final Office Action Issued in U.S. Appl. No. 14/788,174", dated Jun. 15, 2017, 13 Pages.

"Non Final Office Action Issued in U.S. Appl. No. 14/788,174", dated Feb. 17, 2017, 15 Pages.

"Notice of Allowance Issued in U.S. Appl. No. 14/788,174", dated Oct. 24, 2017, 9 Pages.

"Notice of Allowance Issued in U.S. Appl. No. 14/788,174", dated Dec. 4, 2017, 2 Pages.

"Advisory Action Issued in U.S. Appl. No. 14/790,379", dated Nov. 20, 2017, 3 Pages.

"Final Office Action Issued in U.S. Appl. No. 14/790,379", dated Sep. 7, 2017, 11 Pages.

"Non Final Office Action Issued in U.S. Appl. No. 14/790,379", dated Jan. 10, 2018, 9 Pages.

"Non-Final Office Action Issued in U.S. Appl. No. 14/790,379", dated Mar. 24, 2017, 9 Pages.

"Non Final Office Action Issued in U.S. Appl. No. 14/813,245", dated Sep. 8, 2017, 7 Pages.

(56) References Cited

OTHER PUBLICATIONS

"Notice of Allowance Issued in U.S. Appl. No. 14/813,245", dated Apr. 10, 2018, 9 Pages.
"Non Final Office Action Issued in U.S. Appl. No. 14/813,305", dated Jun. 6, 2017, 23 Pages.
"Notice of Allowance Issued in U.S. Appl. No. 14/813,305", dated Sep. 22, 2017, 9 Pages.
"Final Office Action Issued in U.S. Appl. No. 14/837,626", dated Dec. 19, 2017, 10 Pages.
"Non Final Office Action Issued in U.S. Appl. No. 14/837,626", dated Jun. 16, 2017, 13 Pages.
"Notice of Allowance Issued in U.S. Appl. No. 14/837,626", dated Apr. 23, 2018, 9 Pages.
"Final Office Action Issued in U.S. Appl. No. 14/877,281", dated Apr. 19, 2018, 28 Pages.
"Final Office Action Issued in U.S. Appl. No. 14/877,281", dated Jul. 31, 2017, 15 Pages.
"Non-Final Office Action Issued in U.S. Appl. No. 14/877,281", dated Dec. 19, 2017, 25 Pages.
"Non-Final Office Action Issued in U.S. Appl. No. 14/877,281", dated Mar. 30, 2017, 13 Pages.
"Final Office Action Issued in U.S. Appl. No. 14/878,727", dated Dec. 12, 2017, 11 Pages.
"Non Final Office Action Issued in U.S. Appl. No. 14/878,727", dated Apr. 2, 2018, 12 Pages.
"Non Final Office Action Issued in U.S. Appl. No. 14/878,727", dated Apr. 20, 2017, 9 Pages.
"Non Final Office Action Issued in U.S. Appl. No. 14/926,643", dated Jun. 9, 2017, 23 Pages.
"Notice of Allowance Issued in U.S. Appl. No. 14/926,643", dated Dec. 13, 2017, 9 Pages.
Kimmel, et al., "Mobile Display Backlight Light Guide Plates Based on Slanted Grating Arrays", In Journal of Photonics for Energy, vol. 2, Mar. 12, 2012, 3 Pages.
Levola, Tapani, "Diffractive Optics for Virtual Reality Displays", In Journal of the Society for Information Display, vol. 14, Issue 5, Dec. 2006, 1 Page.
Levola, et al., "Replicated Slanted Gratings with a High Refractive Index Material for in and Outcoupling of Light", In Proceedings of the Optics Express, vol. 15, Issue 5, Mar. 5, 2007, 8 Pages.
Mirza, et al., "Key Challenges to Affordable See Through Wearable Displays: The Missing Link for Mobile AR Mass Deployment", In Proceedings of SPIE 8720, Photonic Applications for Aerospace, Commercial, and Harsh Environments IV, May 31, 2013, 6 Pages.
"Second Written Opinion Issued in PCT Application No. PCT/US2016/058332", dated Dec. 14, 2017, 10 Pages.
"International Preliminary Report on Patentability Issued in PCT Application No. PCT/US2016/037460", dated Oct. 17, 2017, 7 Pages.
Zhu et al. "Optical Image Encryption Based on Interference of Polarized Light", In Proceedings of the Optics Express, vol. 17, No. 16, Jul. 20, 2009, 7 Pages.
"International Search Report and Written Opinion Issued in PCT Application No. PCT/US2016/037460", dated Oct. 24, 2016, 12 Pages.
"International Search Report and Written Opinion Issued in PCT Application No. PCT/US2016/038857", dated Sep. 28, 2016, 16 Pages.
"International Preliminary Report on Patentability Issued in PCT Application No. PCT/US2016/039705", dated Nov. 16, 2017, 8 Pages.
Urey, et al., "Microlens Array-Based Exit Pupil Expander for Full-Color Display Applications", In Proceedings of the SPIE in Photon Management, vol. 5456, Apr. 1, 2004, 10 Pages.
"International Search Report & Written Opinion Issued in PCT Application No. PCT/US2016/039705", dated Sep. 15, 2016, 13 Pages.
"Second Written Opinion Issued in PCT Application No. PCT/US2016/039705", dated Jul. 10, 2017, 8 Pages.
"International Preliminary Report on Patentability Issued in PCT Application No. PCT/US2016/039706", dated Oct. 31, 2017, 6 Pages.
"International Search Report and Written Opinion Issued in PCT Application No. PCT/US2016/039706", dated Oct. 6, 2016, 13 Pages.
"Second Written Opinion Issued in PCT Application No. PCT/US2016/039706", dated Jun. 27, 2017, 5 Pages.
Srinivasan, Pradeep, "Design and Fabrication of Space Variant Micro Optical Elements", Retrieved From: http://etd.fcla.edu/CF/CFE0002843/Srinivasan_Pradeep_200908_PhD.pdf, Retrieved Date: Nov. 27, 2014, 160 Pages.
"International Preliminary Report on Patentability Issued in PCT Application No. PCT/US2016/044947", dated Nov. 16, 2017, 9 Pages.
"International Search Report and Written Opinion Issued in PCT Application No. PCT/US2016/044947", dated Oct. 11, 2016, 14 Pages.
"Second Written Opinion Issued in PCT Application No. PCT/US2016/044947", dated Jul. 13, 2017, 8 Pages.
"International Preliminary Report on Patentability Issued in PCT Application No. PCT/US2016/051563", dated Jan. 22, 2018, 7 Pages.
"International Search Report and Written Opinion Issued in PCT Application No. PCT/US2016/051563", dated Nov. 18, 2016, 10 Pages.
"Second Written Opinion Issued in PCT Application No. PCT/US2016/051563", dated Aug. 17, 2017, 5 Pages.
"International Preliminary Report on Patentability Issued in PCT Application No. PCT/US2016/058332", dated Feb. 13, 2018, 11 Pages.
"International Search Report and Written Opinion Issued in PCT Application No. PCT/US2016/058332", dated Feb. 21, 2017, 14 Pages.
"Second Written Opinion Issued in PCT Application No. PCT/US2016/061014", dated Nov. 3, 2017, 50 5 Pages.
"Non Final Office Action Issued in U.S. Appl. No. 14/877,281", dated Sep. 11, 2018, 29 Pages.
"Notice of Allowance Issued in U.S. Appl. No. 14/878,727", dated Oct. 4, 2018, 11 Pages.

* cited by examiner

RAINBOW REMOVAL IN NEAR-EYE DISPLAY USING POLARIZATION-SENSITIVE GRATING

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In a near-eye optical display system comprising a waveguide and diffractive optical elements (DOEs) configured for in-coupling, exit pupil expansion, and out-coupling, a rainbow phenomenon manifested in the display caused by external real-world light and/or stray light being transmitted and diffracted out by the system may be removed or reduced using a polarizing filter at the front of the system so that real-world/stray light entering the system has a particular polarization state, for example TM-polarized. The polarizing filter is utilized in conjunction with a downstream out-coupling DOE that includes diffractive grating structures that are configured to enable sensitivity to an opposite polarization state, for example TE-polarized. An imager is configured to produce virtual-world objects that also have a TE-polarized state. The polarization-sensitive out-coupling DOE diffracts the TE-polarized imaging beam out of the grating for display while the TM-polarized light from the real world and/or stray light passes through the grating without diffraction and thus cannot contribute to rainbows in the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
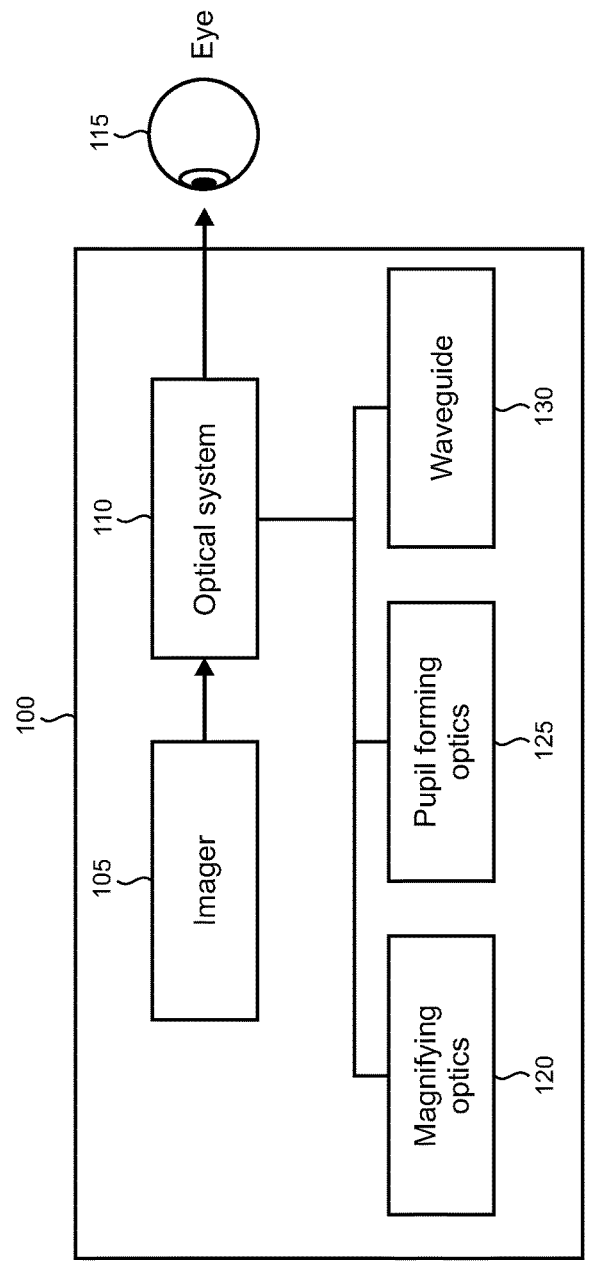
FIG. 1 shows a block diagram of an illustrative near-eye display system which may incorporate a polarization-sensitive grating configured to reduce a rainbow effect in the display caused by light from the external real-world and/or stray light.

FIG. 1 shows a block diagram of an illustrative near-eye display system 100 which may incorporate one or more polarization-sensitive gratings for blocking the transmission of extraneous real-world stray light in the system that can cause rainbowing. In an illustrative embodiment, the near-eye display system uses a combination of diffractive optical elements (DOEs) that provide in-coupling of incident light into a waveguide, exit pupil expansion in two directions, and out-coupling of light out of the waveguide. Near-eye display systems are frequently used, for example, in head mounted display (HMD) devices in industrial, commercial, and consumer applications. Other devices and systems may also use polarization-sensitive gratings, as described below. The near-eye display system 100 is an example that is used to illustrate various features and aspects, and the polarization-sensitive gratings are not necessarily limited to near-eye display systems using DOEs.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near-eye display system the imager does not actually shine the images on a surface such as a glass lens to create the visual display for the user. This is not feasible because the human eye cannot focus on something that is that close. Rather than create a visible image on a surface, the near-eye optical system 100 uses the pupil forming optics 125 to form a pupil and the eye 115 acts as the last element in the optical chain and converts the light from the pupil into an image on the eye's retina as a virtual display.

Figure 2:
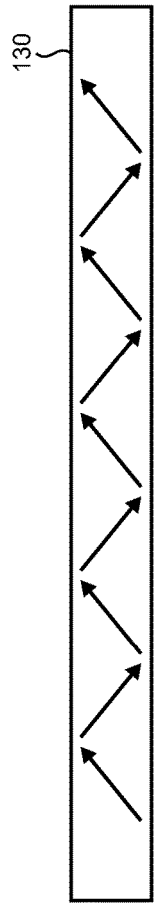
FIG. 2 shows propagation of light in a waveguide by total internal reflection.

The waveguide 130 facilitates light transmission between the imager and the eye. One or more waveguides can be utilized in the near-eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
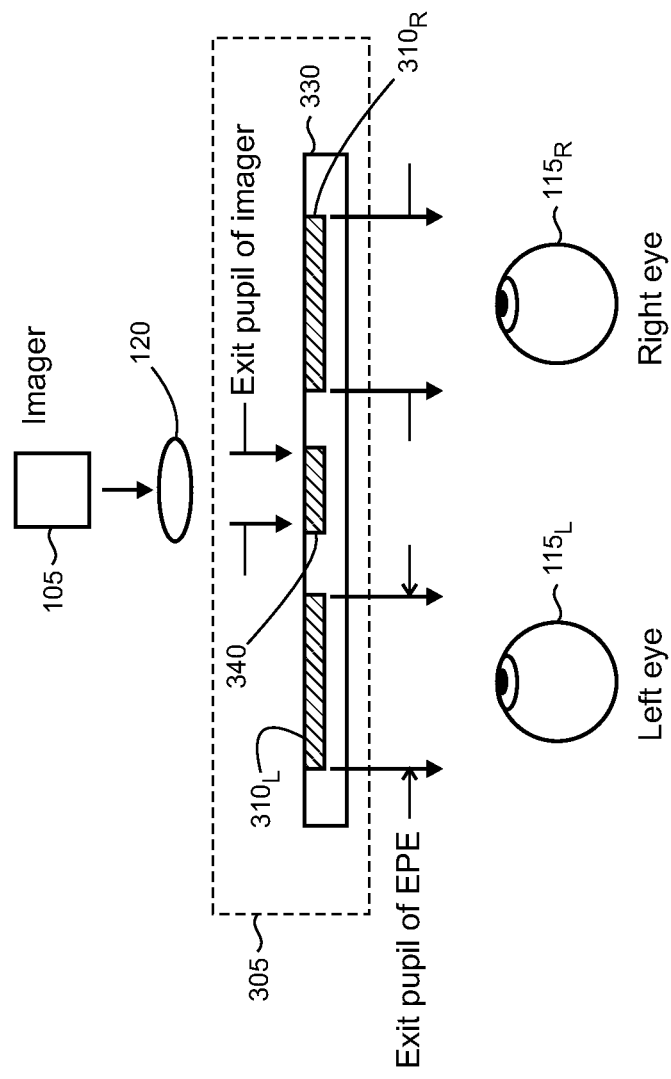
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below. While the EPE 305 is depicted as having a planar configuration, other shapes may also be utilized including, for example, curved or partially spherical shapes, in which case the gratings disposed thereon are non-coplanar.

Figure 4:
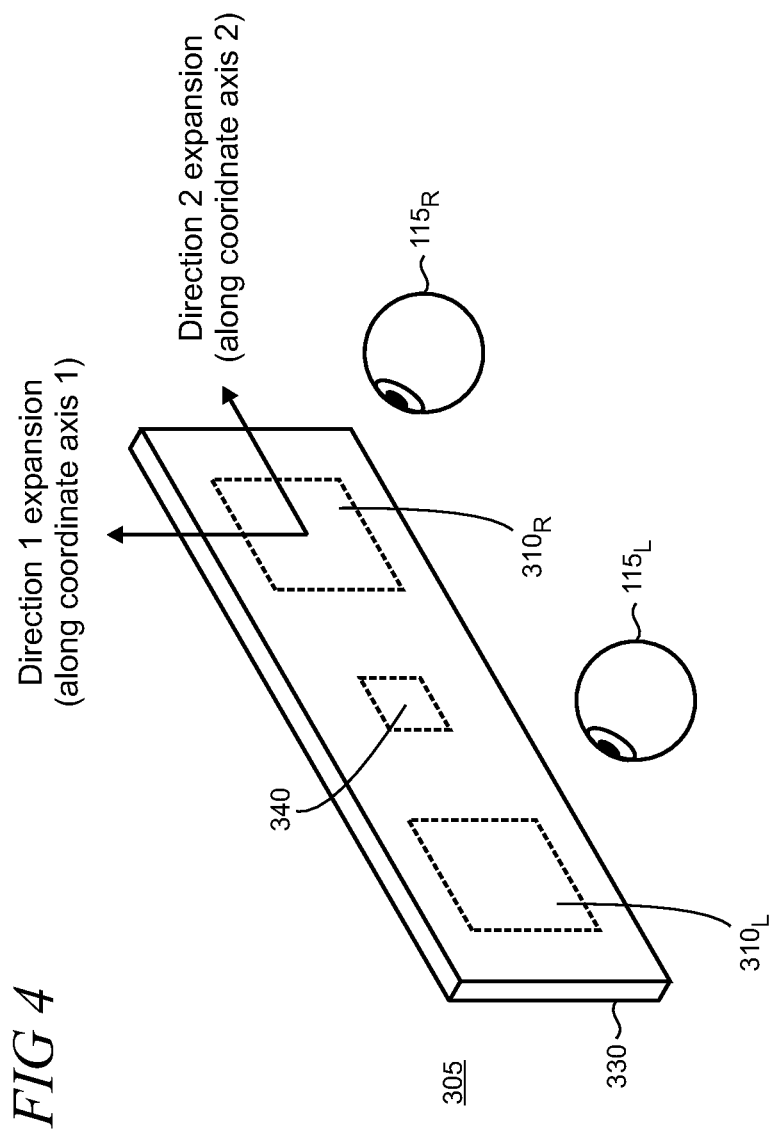
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of DOEs with polarization-sensitive gratings.

Near-eye display systems using diffractive gratings can be susceptible to rainbows that are visible in the display which are caused by the system's transmission and refraction of light from the external real-world and/or stray light. The rainbows can have the same luminance as the virtual images shown on the display and what the user sees of the external real-world through the optical display and thus may block images and/or otherwise compromise display effectiveness. A variety of solutions have been implemented for blocking the transmission and refraction of this real-world/stray light in display systems which cause rainbows.

Figure 5:
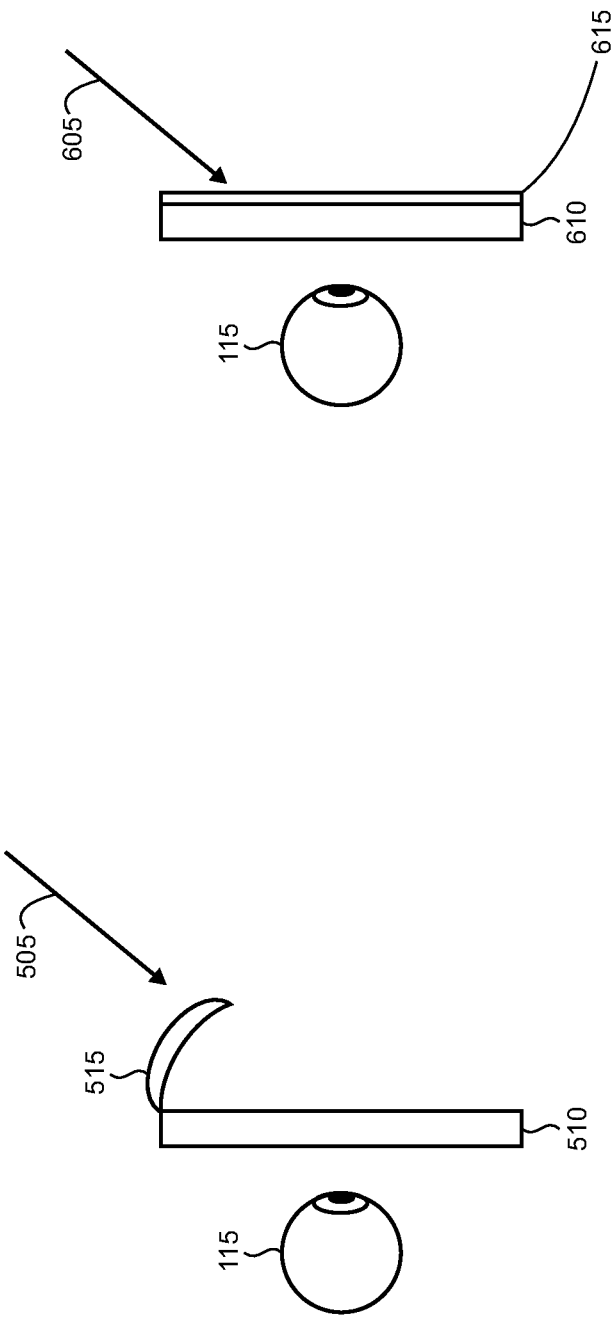
FIG. 5 shows an illustrative near-eye display in which a visor is utilized to reduce transmission of real-world/stray light.

As shown in FIG. 5, real-world/stray light 505 can be blocked from impinging on the side of a waveguide 510 opposite the eye 115 using a visor 515 (it is noted that other components of the display system are omitted from the drawing for sake of clarity in exposition). While the visor 515 can provide satisfactory light blocking in some implementations, not all light from all incident angles can be blocked. In addition, a visor can add weight to the display system and thus may be a less optimal solution particularly, for example, in HMD applications.

Figure 6:
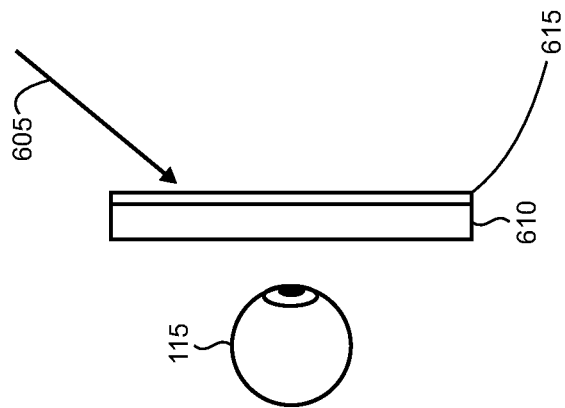
FIG. 6 shows an illustrative near-eye display in which an absorbing layer is utilized to reduce transmission of real-world/stray light.

FIG. 6 shows another illustrative solution for blocking real-world/stray light 605 using a light absorbing layer 615 that is disposed on the light-incident side of a waveguide 610. The light absorbing layer 615 may be formed, for example, using a coating or other suitable light absorbing material. While the light absorbing layer generally does not add significant weight to the system, it may compromise optical performance of the display system in some cases because light absorption is sensitive to wavelength and/or the angle of incidence. In addition, the light absorbing layer can add opacity to the display which may reduce the user's ability to see through the display in mixed reality applications.

Figure 7:
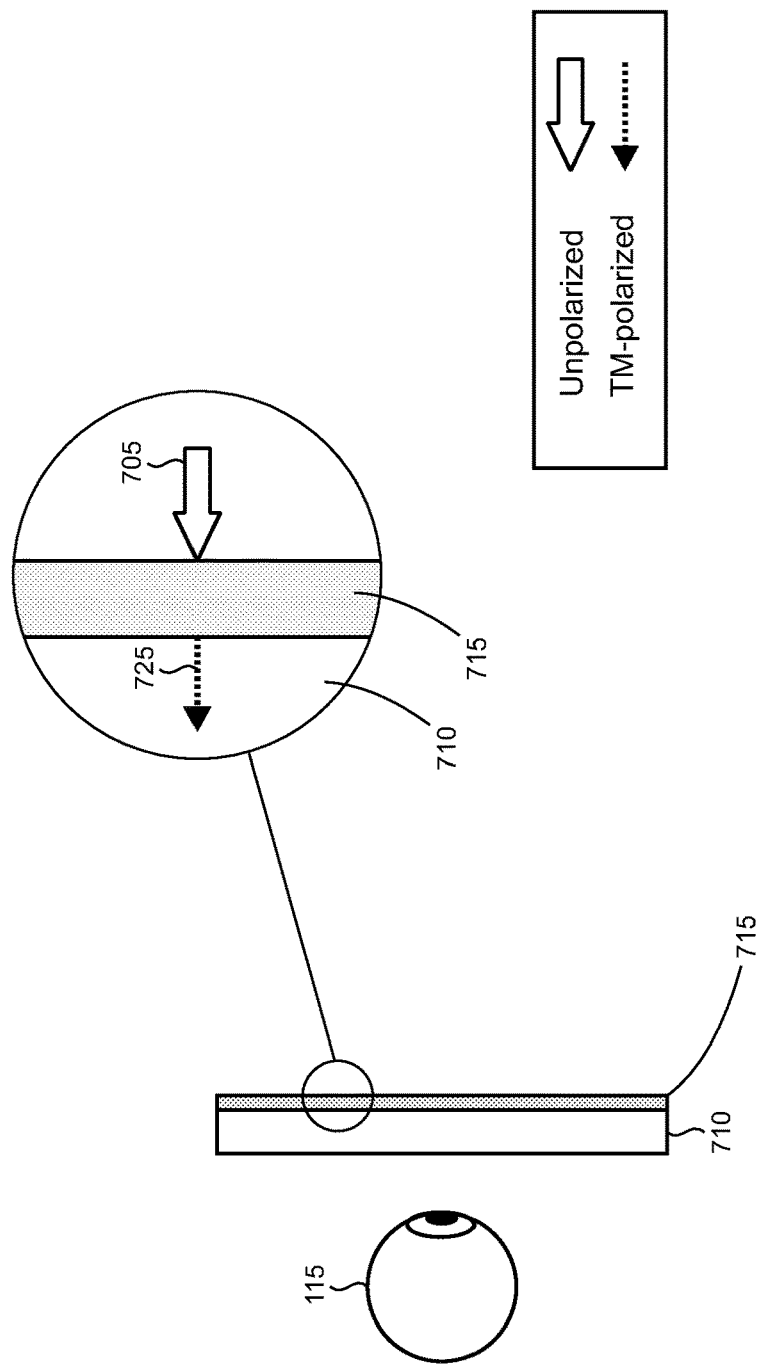
FIG. 7 shows an illustrative near-eye display in which a polarizing filter is utilized to reduce transmission of real-world/stray light.

In comparison to the physical light blocking visor 515 and light absorbing layer 615 shown respectively in FIGS. 5 and 6, FIG. 7 shows an arrangement in which a polarizing filter 715 is disposed on the front, i.e., light-incident side of a waveguide 710 used with an EPE in a near-eye display system. The polarizing filter 715 can operate in conjunction with a downstream polarization-sensitive out-coupling DOE to remove or reduce rainbows caused by the transmission and diffraction of real-world/stray light out of the EPE, as described below in the description accompanying FIG. 8.

The polarizing filter 715 may be embodied using a separate layer, as shown in this particular illustrative example, but the filter can also be directly incorporated into the structure of the waveguide 710 in whole or part. In some implementations, the polarizing filter 715 can be partially or fully implemented as a discrete optical element that is separate from the waveguide, and/or the filter may incorporate its own waveguide structure. The polarizing filter 715 can be configured and shaped to suit a given application. For example, the filter can be planar, curved, or use a combination of planar and curved elements. In some applications, the polarizing filter can be incorporated into a protective shield, lens, or other suitable component of a display system. The polarizing filter can be implemented using a molded polymer substrate in some implementations which may be beneficial in applications where weight and bulk is sought to be minimized, such as in HMD systems and devices.

In this illustrative example, the polarizing filter 715 is linearly polarizing so that unpolarized light 705 impinging on the optical display system from the external real-world or as stray light enters the system as TM-polarized light, as indicated by arrow 725. In other implementations, the polarizing filter 715 can be configured to filter the impinging unpolarized light into TE-polarized light. The filter 715 can also be configured to impose circular polarization (e.g., left- or right-hand circular polarization) in some cases.

Figure 8:
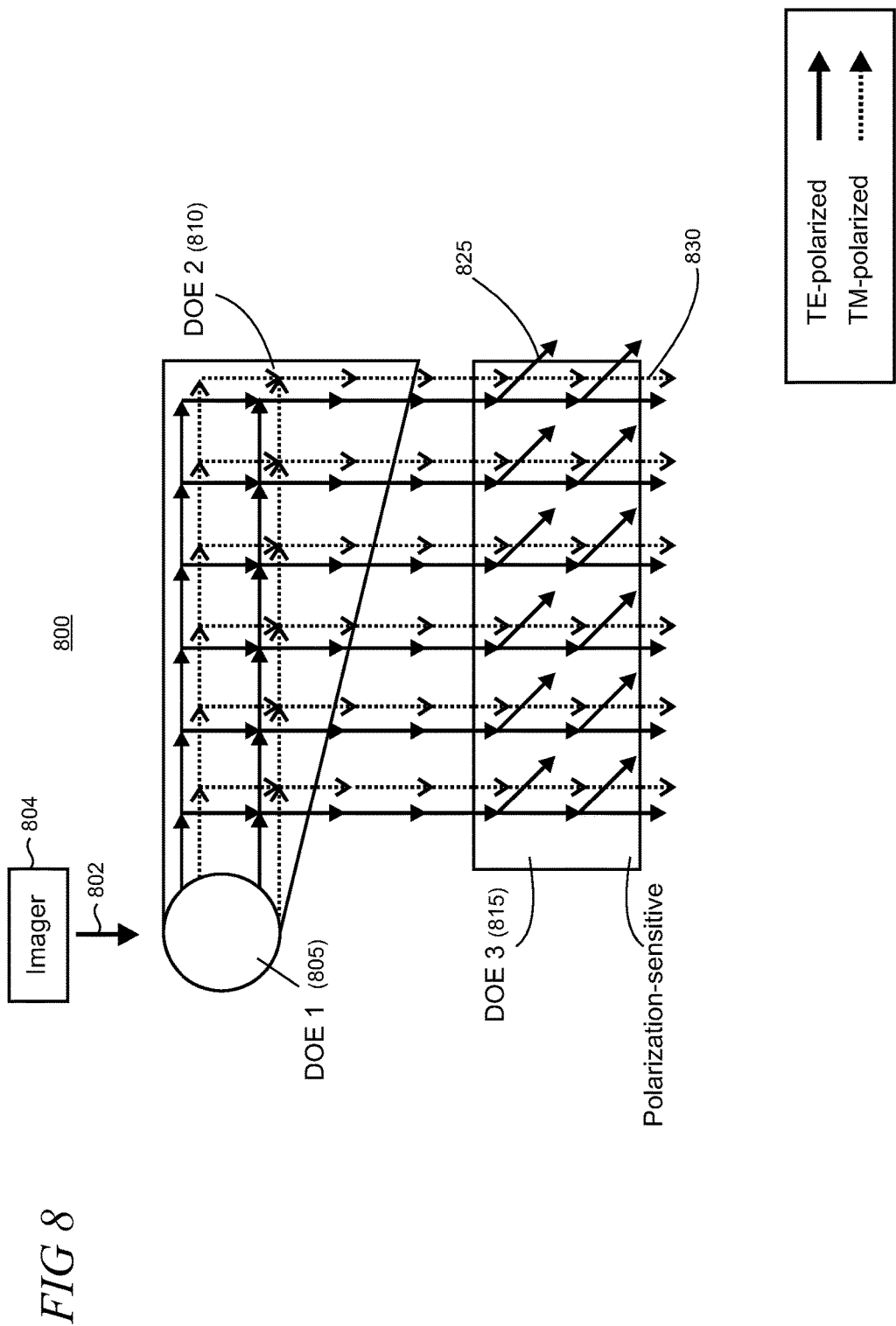
FIG. 8 shows an illustrative arrangement of three DOEs configured for in-coupling, exit pupil expansion, and out-coupling in which the out-coupling DOE is implemented using a polarization-sensitive grating.

FIG. 8 shows an illustrative arrangement 800 of three DOEs that may be used with, or as a part of, a waveguide to provide in-coupling, expansion of the exit pupil in two directions, and out-coupling in an EPE in which the out-coupling DOE is implemented as a polarization-sensitive grating. The polarization-sensitive out-coupling DOE operates in combination with the upstream polarizing filter 715 shown in FIG. 7 and described in the accompanying text, to remove or reduce rainbows produced by the diffraction of real-world/stray light in the EPE.

Each DOE is an optical element comprising a periodic structure that can modulate various properties of light in a periodic pattern such as the direction of optical axis, optical path length, and the like. The first DOE, DOE 1 (indicated by reference numeral 805), is configured to couple an imaging beam 802 from an imager 804 into the waveguide. The imaging beam 802, in this illustrative example, is TE-polarized. Thus, the imaging beam 802 has an orthogonal state of polarization with respect to the TM-polarized real-world/stray light after being filtered by the linearly polarizing filter, as described above. The second DOE, DOE 2 (810), expands the exit pupil in a first direction along a first coordinate axis, and the third DOE, DOE 3 (815), expands the exit pupil in a second direction along a second coordinate axis and couples light out of the waveguide (it is noted that the various directions of propagation in FIG. 8 are depicted in an arbitrary manner and that the directions are not necessarily orthogonal).

DOE 1 thus functions as an in-coupling grating and DOE 3 functions as an out-coupling grating while expanding the pupil in one direction. DOE 2 may be considered as an intermediate grating that functions to couple light between the in-coupling and out-coupling gratings while performing exit pupil expansion in another direction. Using such intermediate grating may eliminate a need for conventional functionalities for exit pupil expansion in an EPE such as collimating lenses.

In this particular example, DOE 3 is configured to be polarization-sensitive so that it diffracts only TE-polarized light out of the grating while TM-polarized light is passed straight through the grating without being refracted out. This polarization-sensitive out-coupling function for TE-polarized light is representatively shown in FIG. 8 by reference numeral 825 while the pass-through function for TM-polarized light is representatively indicated by reference numeral 830. Because the TM-polarized light is passed through the grating without being diffracted out, stray light or light from the external world does not cause rainbows in the optical display. In alternative implementations, polarization sensitivity can be implemented in various portions of one or more of the DOEs in the arrangement 800. For example, the DOE portions can include grating features configured to perform a conversion from one polarization state to another so that an input at the in-coupling grating DOE 1 in one polarization state (e.g., TM-polarized) is converted by the grating features to the other polarization state (e.g., TE-polarized) prior to being out-coupled from the out-coupling grating DOE 3. In another illustrative implementation, one or more of the DOEs can be configured with polarization sensitivity to diffract, for example, only the TE-polarized light while passing through TM-polarized light so that only the light from the imager is out-coupled to the display without the interaction with the real-world/stray light that gives rise to rainbows.

Continuing with this example, the three-dimensional microstructure forming the out-coupling grating, DOE 3, can be configured to be polarization-sensitive by manipulating a combination of grating parameters that relate to grating line asymmetry and fill ratio. Grating depth is another exemplary parameter that can be manipulated in combination with grating line asymmetry and fill ratio in some cases. These parameters can be selected, adjusted, and/or tuned to implement polarization sensitivity in DOE 3 so that only TE-polarized light from the imager is out-coupled from DOE 3 while the TM-polarized real-world/ stray light passes through DOE 3 with minimal/no diffraction interaction. In some implementations, the grating parameters can be iteratively manipulated in a given grating design until polarization-sensitivity is achieved so that the degree of rainbows observed in DOE 3 meets some predetermined criteria.

Figure 9:
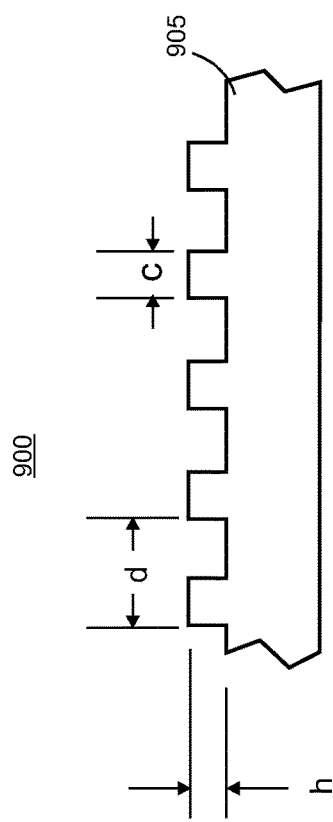
FIG. 9 shows a profile of a portion of an illustrative diffraction grating that has straight gratings.
Figure 10:
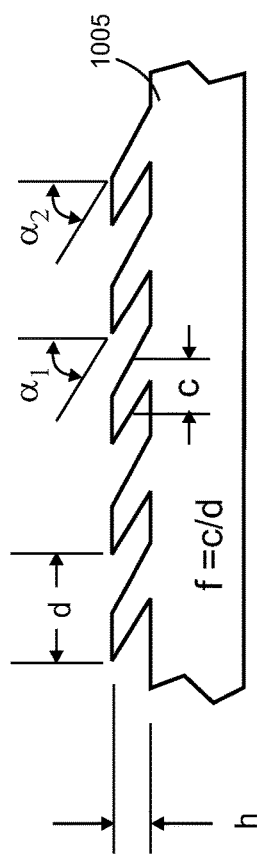
FIG. 10 shows an asymmetric profile of a portion of an illustrative diffraction grating that has asymmetric or slanted gratings.

Grating line asymmetry is described in more detail while making reference to FIGS. 9 and 10. FIG. 9 shows a profile of straight (i.e., non-slanted) grating features 900 (referred to as grating bars, grating lines, or simply "gratings"), that are formed in a substrate 905. By comparison, FIG. 10 shows grating features 1000 formed in a substrate 1005 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 9 and 10, the grating period is represented by d, the grating height by h (also referred to as grating "depth"), bar width by c, and the fill factor by f, where f=c/d. The slanted gratings in FIG. 10 may be described by slant angles $\alpha_1$ and $\alpha_2$.

The out-coupling DOE 3 may also be configured to be polarization-sensitive by using birefringent materials such as liquid crystal, anisotropic crystal or strained materials. In some implementations, gratings can be filled with a liquid crystal material that effectively removes the refractive index contrast for one polarization state.

Figure 11:
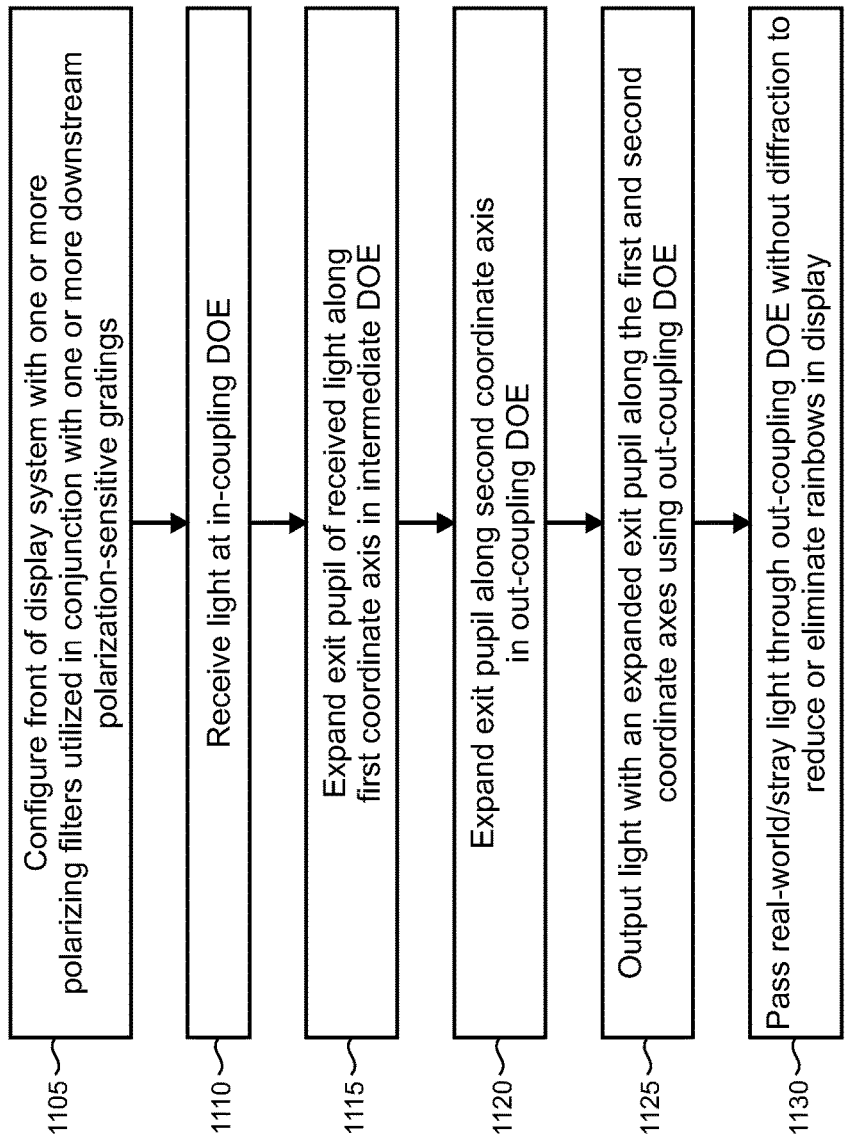
FIG. 11 shows an illustrative method.

FIG. 11 is a flowchart of an illustrative method 1100. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1105, the front of a near-eye display system (i.e., a forward-facing portion of the system on which stray light and/or light from the external real-world impinges) is configured with one or more polarizing filters that are used in conjunction with one or more downstream polarization-sensitive gratings. In step 1110, imaging light from an imager is received at an in-coupling DOE disposed in an EPE. The use of the polarizing filter enables light from non-imager sources such as stray light and/or light from the external real world to be in a polarization state that is opposite (e.g., linearly-orthogonal) to the imaging light. The in-coupling DOE interfaces with a downstream intermediate DOE that is disposed in the EPE. The intermediate DOE is configured to interface with a downstream out-coupling DOE.

In step 1115, the exit pupil of the received light is expanded along a first coordinate axis in the intermediate DOE. In step 1120, the exit pupil is expanded along a second coordinate axis in an out-coupling DOE. In step 1125, the out-coupling DOE diffracts light out as an output from the EPE with an expanded exit pupil relative to the received light at the in-coupling DOE along the first and second coordinate axes. In some implementations, the out-coupling DOE may be apodized with shallow gratings that are configured to be either straight or slanted. In step 1130, at least a portion of external real-world light and/or stray light having a different polarization state than the imaging light is passed through the out-coupling DOE without being diffracted out to reduce or eliminate rainbows in the display.

Polarization-sensitive gratings may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 12:
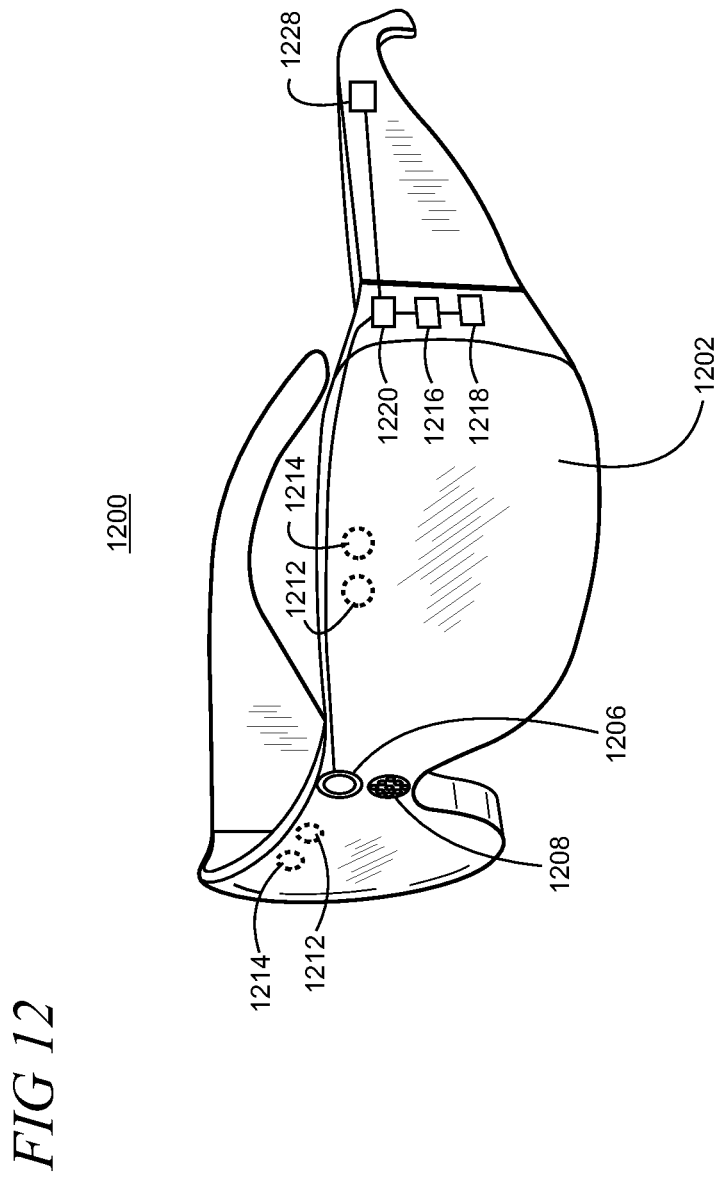
FIG. 12 is a pictorial view of an illustrative example of a virtual reality or mixed reality head mounted display (HMD) device.
Figure 13:
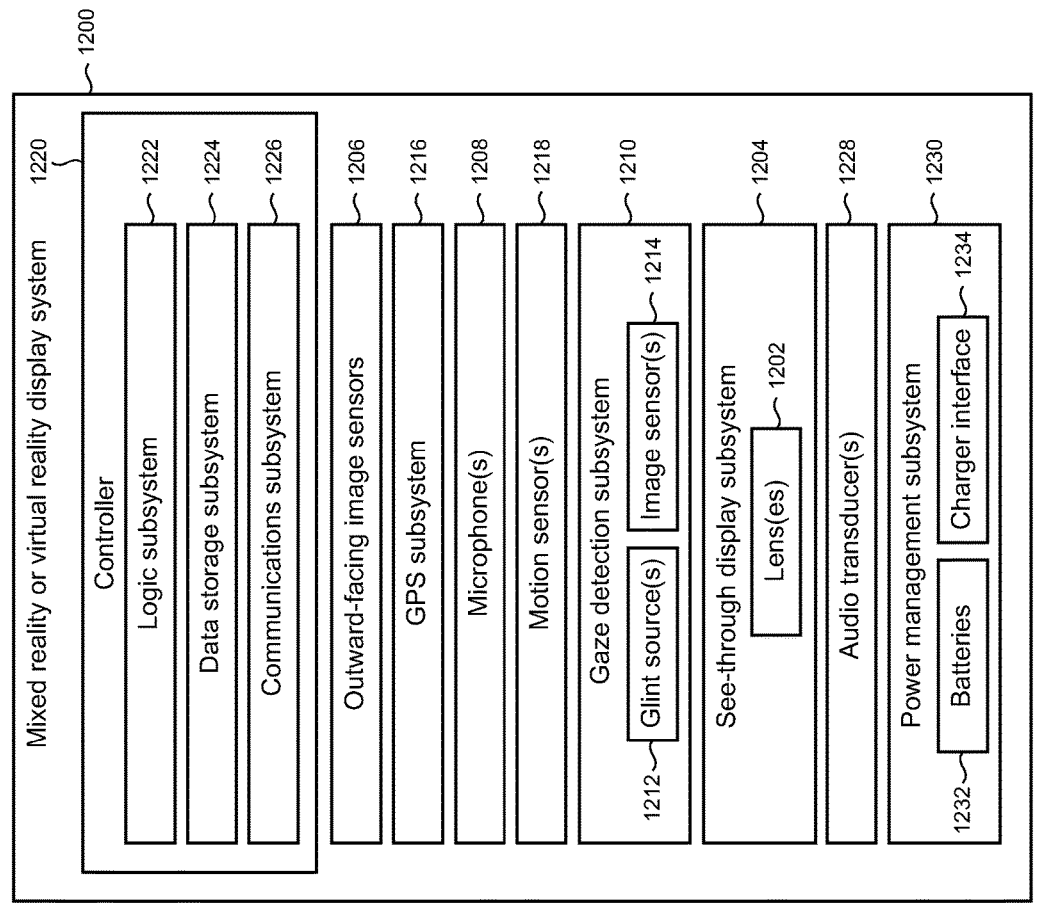
FIG. 13 shows a block diagram of an illustrative example of a virtual reality or mixed reality HMD device.

FIG. 12 shows one particular illustrative example of a see-through, mixed reality or virtual reality display system 1200, and FIG. 13 shows a functional block diagram of the system 1200. Display system 1200 comprises one or more lenses 1202 that form a part of a see-through display subsystem 1204, such that images may be displayed using lenses 1202 (e.g. using projection onto lenses 1202, one or more waveguide systems incorporated into the lenses 1202, and/or in any other suitable manner). Display system 1200 further comprises one or more outward-facing image sensors 1206 configured to acquire images of a background scene and/or physical environment being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The display system 1200 may also include additional sensors. For example, display system 1200 may comprise a global positioning system (GPS) subsystem 1216 to allow a location of the display system 1200 to be determined. This may help to identify real-world objects, such as buildings, etc. that may be located in the user's adjoining physical environment.

The display system 1200 may further include one or more motion sensors 1218 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the display system 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1200 can further include a controller 1220 having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1200 is configured with one or more audio transducers 1228 (e.g., speakers, earphones, etc.) so that audio can be utilized as part of a mixed reality or virtual reality experience. A power management subsystem 1230 may include one or more batteries 1232 and/or protection circuit modules (PCMs) and an associated charger interface 1234 and/or remote power interface for supplying power to components in the display system 1200.

It may be appreciated that the display system 1200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 14:
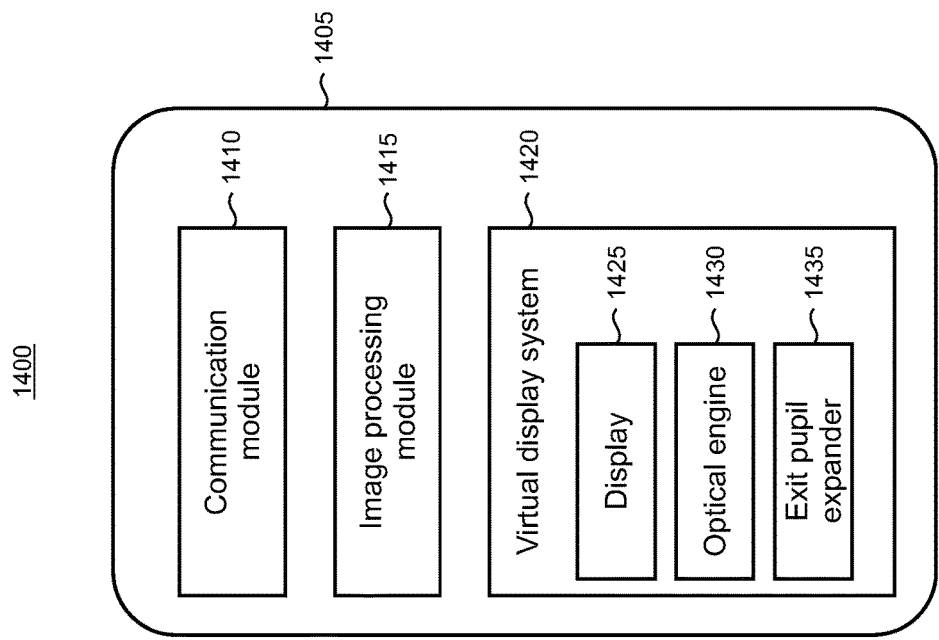
FIG. 14 shows a block diagram of an illustrative electronic device that incorporates an exit pupil expander.

As shown in FIG. 14, polarization-sensitive gratings for removal or reduction of rainbows can be used in a mobile or portable electronic device 1400, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1400 includes a housing 1405 to house a communication module 1410 for receiving and transmitting information from and to an external device, or a remote system or service (not shown).

The portable device 1400 may also include an image processing module 1415 for handling the received and transmitted information, and a virtual display system 1420 to support viewing of images. The virtual display system 1420 can include a micro-display or an imager 1425 and an optical engine 1430. The image processing module 1415 may be operatively connected to the optical engine 1430 to provide image data, such as video data, to the imager 1425 to display an image thereon. An EPE 1435 can be optically linked to an optical engine 1430. The EPE may incorporate or be part of a system that includes polarization-sensitive gratings for removal or reduction of rainbows in the device display.

Polarization-sensitive gratings for removal or reduction of rainbows may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present rainbow removal in near-eye display using polarization-sensitive grating are now presented by way of illustration and not as an exhaustive list of all embodiments. An example includes an optical system, comprising: a polarizing filter configured to filter stray light, or light from real-world objects, into a first polarization state; a substrate of optical material; a first diffractive optical element (DOE) disposed on the substrate, the first DOE having an input surface and configured as an in-coupling grating to receive one or more optical beams having a second polarization state as an input; and a second DOE disposed on the substrate and configured for pupil expansion of the one or more optical beams along a first direction, a third DOE disposed on the substrate, the third DOE having an output surface and configured for pupil expansion of the one or more optical beams along a second direction, and further configured as an out-coupling grating to out-couple, as an output display from the output surface, one or more optical beams with expanded pupil relative to the input, wherein the out-coupling grating is configured for sensitivity to the second polarization state so that only optical beams in the second polarization state are out-coupled as the output from the third DOE.

In another example, the out-coupling grating is further configured to pass through the filtered light in the first polarization state without diffraction to prevent rainbowing in the output display. In another example, grating features in at least one of the DOEs are configured according to one or more of grating asymmetry, grating depth, or grating fill factor. In another example, the grating asymmetry is implemented using one of slanted gratings or blazed gratings. In another example, the polarizing filter is disposed in a forward-facing portion of the optical system upon which stray light or light from the real-world objects impinges.

A further example includes an electronic device supporting a mixed reality experience including elements from a virtual world and elements from a real world, comprising: a data processing unit; an optical engine operatively connected to the data processing unit for receiving image data from the data processing unit; an imager operatively connected to the optical engine to form virtual images based on the image data and to generate one or more input optical beams incorporating the virtual images having a first polarization state; and an exit pupil expander, responsive to the one or more input optical beams, comprising a structure on which multiple diffractive optical elements (DOEs) are disposed, in which the exit pupil expander is configured to provide one or more out-coupled optical beams, using one or more of the DOEs, as a near-eye display with an expanded exit pupil, and wherein at least one of the DOEs has a portion configured to be polarization-sensitive so the exit pupil expander outputs the virtual images having the first polarization state as the out-coupled optical beams while passing through stray light or light associated with the real world having a second polarization state to suppress rainbowing in the near-eye display.

In another example, the portion of the DOE supports multiple optical paths to a given point within the portion of the DOE wherein differences in the multiple optical path lengths exceed a coherence length of an input optical beam. In another example, the exit pupil expander provides pupil expansion in two directions. In another example, the imager includes one of light emitting diode, liquid crystal on silicon device, organic light emitting diode array, or micro-electro mechanical system device. In another example, the imager comprises a micro-display operating in one of transmission, reflection, or emission. In another example, the electronic device is implemented in a head mounted display device or portable electronic device. In another example, each of the one or more input optical beams is produced by a corresponding one or more sources. In another example, the electronic device further includes a polarizing filter that interoperates with the exit pupil expander so that the stray or real-world light impinging on exit pupil expander is polarized. In another example, the exit pupil expander includes grating features that convert polarization state from the first polarization state to the second polarization state.

A further example includes a method, comprising: receiving, from an imager, imaging light in a first polarization state at an in-coupling diffractive optical element (DOE) disposed in an exit pupil expander; utilizing a polarizing filter so that non-imaging light received from non-imager sources has a second polarization state that is opposite to the first polarization state; expanding an exit pupil of the received imaging light along a first coordinate axis in an intermediate DOE disposed in the exit pupil expander; expanding the exit pupil along a second coordinate axis in an out-coupling DOE disposed in the exit pupil expander; and outputting imaging light in a display with an expanded exit pupil relative to the received light at the in-coupling DOE along the first and second coordinate axes using the out-coupling DOE, in which the out-coupling DOE includes grating features configured for polarization-sensitivity so that the out-coupling DOE diffracts the imaging light in the first polarization state as the output from the exit pupil expander and passes the non-imaging light in the second polarization state through without diffraction to reduce rainbowing in the display.

In another example, the first and second polarization states include one of linearly-polarized or circularly-polarized. In another example, one or more of the in-coupling DOE, intermediate DOE, or out-coupling DOE include portions having grating features configured to perform a conversion on an input to the in-coupling DOE from the first polarization state to the second polarization state. In another example, the polarization conversion is performed upstream from the outputting from the out-coupling DOE. In another example, the method is performed in a near-eye display system. In another example, the non-imaging light comprises one of stray light or light associated with a real-world environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical system configured to provide a display for a user, comprising:
   a transparent substrate of optical material configured as a waveguide, the waveguide having a back side that is located adjacent to an eye of a user when the optical system is in use, and the waveguide having a front side opposite the back side;
   a polarizing filter positioned on a front side of the waveguide, the polarizing filter being configured to filter stray light entering the waveguide, or light from real-world objects entering the waveguide, into a first polarization state;
   an imager configured to generate one or more optical beams having a second polarization state that is different from the first polarization state;
   a first diffractive optical element (DOE) disposed on the waveguide, the first DOE having an input surface and configured as an in-coupling grating to receive, from the imager, one or more optical beams having the second polarization state as an input;
   a second DOE disposed on the waveguide and configured for pupil expansion of the one or more optical beams having the second polarization state along a first direction; and
   a third DOE disposed on the waveguide and configured to receive the one or more optical beams in the second polarization state from the second DOE, the third DOE configured for pupil expansion of the one or more optical beams along a second direction, and further configured as an out-coupling grating to out-couple, as an output display to the eye of the user from the back side of the waveguide, one or more optical beams with expanded pupil relative to the input,
   wherein the out-coupling grating is configured for sensitivity to the second polarization state so that only the one or more optical beams in the second polarization state received from the second DOE are out-coupled as the output display to the eye of the user from the back side of the waveguide and the stray light or light from real-world objects in the first polarization state passes through the out-coupling grating without being out-coupled from the back side of the waveguide to the eye of the user third DOE.

2. The optical system of claim 1 in which configurations of grating features in at least one of the DOEs include one or more of grating asymmetry, grating depth, or grating fill factor.

3. The optical system of claim 2 in which the grating asymmetry is implemented using one of slanted gratings or blazed gratings.

4. The optical system of claim 1 in which the configuration of the out-coupling grating in the third DOE is such that stray light of the first polarization state does not interfere with guided light of the second polarization state.

* * * * *